(12) United States Patent
Misawa (10) Patent No.: US 6,671,462 B2
(45) Date of Patent: Dec. 30, 2003

(54) CAMERA WITH WHICH BATTERY IS USED

(75) Inventor: Atsushi Misawa, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/232,523

(22) Filed: Sep. 3, 2002

(65) Prior Publication Data

US 2003/0044183 A1 Mar. 6, 2003

(30) Foreign Application Priority Data

Sep. 3, 2001 (JP) .......................................... 2001-265579

(51) Int. Cl.⁷ ............................................... G03B 17/02
(52) U.S. Cl. ....................................................... 396/539
(58) Field of Search ................................. 396/278, 301, 396/535, 539; 348/372

(56) References Cited

U.S. PATENT DOCUMENTS

| | | | | |
|---|---|---|---|---|
| 3,988,751 A | * | 10/1976 | Goto ........................... | 396/539 |
| 4,007,470 A | * | 2/1977 | Land ........................... | 396/535 |
| 5,036,343 A | * | 7/1991 | Yamanaka ................... | 396/539 |
| 5,822,631 A | * | 10/1998 | Endoh et al. ................ | 396/301 |
| 6,101,339 A | * | 8/2000 | Miki et al. .................. | 396/301 |

FOREIGN PATENT DOCUMENTS

JP        6-59322        3/1994

\* cited by examiner

*Primary Examiner*—Christopher Mahoney
(74) *Attorney, Agent, or Firm*—Sughrue Mion, PLLC (57) ABSTRACT

A digital still camera has a power source circuit, CCD and the like which are supplied with power by a battery having positive and negative electrodes. A camera body has the power source circuit, CCD and the like incorporated therein. First and second electrode caps are secured to an outside of the camera body, and are fitted on the positive and negative electrodes. First and second terminal springs are incorporated in the first and second electrode caps, for connecting the power source circuit, CCD and the like electrically with the positive and negative electrodes.

24 Claims, 7 Drawing Sheets

FIG. 8B ical camera. The battery
CAMERA WITH WHICH BATTERY IS USED

BACKGROUND OF THE INVENTION

1. Field of the Invention

The present invention relates to a camera with which a battery is used. More particularly, the present invention relates to a camera with which a battery is used, and of which a structure for holding a battery is improved to reduce a size of the camera.

2. Description Related to the Prior Art

A camera has a battery chamber for containing at least one battery as power source, for the purpose of driving various elements including a motor, micro computer, flash device and the like. The structure with the battery chamber is likely to cause the camera to have a larger size, and is inconsistent to intention to reduction of the size of the camera. There is a suggestion in JP-A 6-059322 in which elements are laid out in a camera to minimize spaces required by those for the purpose of having a compact battery chamber.

A digital still camera is well-known and widely used, in which an image sensor is driven, a liquid crystal display panel displays an image, and image data is read and written. Higher electric power is used in the digital still camera than in comparison with a photographic camera. The battery chamber is required to have a size for being loaded with a predetermined plural number of dry battery of the AA type. Therefore, the battery chamber having a great size is used as a grip. Also, contact points are disposed on an outer surface of the camera without forming the battery chamber. A battery pack may be attached to the camera externally by contact with the contact points, and can supply power of plural batteries.

However, a proportion of a volume of the battery chamber to a size inside the camera becomes higher according to a degree of reduction of size of the camera. The existence of the battery chamber is a serious problem in reducing the size of the camera. If the battery chamber is used as a grip, or if a battery pack is attached to the camera removably, it is impossible to reduce the volume of the battery chamber or the battery pack even in a state before insertion of the battery. The camera cannot be portable due to the battery chamber typically when carried manually by a user.

SUMMARY OF THE INVENTION

In view of the foregoing problems, an object of the present invention is to provide a camera with which a battery is used, and of which a structure for holding a battery is improved to reduce a size of the camera.

In order to achieve the above and other objects and advantages of this invention, a camera has an electric circuit for being supplied with power by a battery having first and second electrodes. A camera body has the electric circuit incorporated therein. First and second electrode caps are secured to an outside of the camera body, for being fitted on the first and second electrodes. First and second terminals are incorporated in the first and second electrode caps, for connecting the electric circuit electrically with the first and second electrodes.

The battery is in a substantially cylindrical shape, and has the first and second electrodes disposed at first and second ends thereof as viewed longitudinally.

Furthermore, first and second support arms are disposed to protrude externally from the camera body, for supporting the first and second electrode caps at ends thereof.

The first and second support arms are tubular. Furthermore, first and second connection lines are connected with the electric circuit, covered inside the first and second support arms, for being connected with the first and second electrodes by the first and second terminals.

Furthermore, a release switch is secured to the first electrode cap, for photographing an image upon being operated.

Furthermore, first and second packing rings are secured to an inner surface of the first and second electrode caps, for keeping the first and second electrodes shielded from foreign material.

Furthermore, at least one release signal line is contained in the first support arm, for extending between the release switch and the electric circuit, to send a signal generated upon turning on of the release switch.

The first and second terminals have a springy characteristic, and are compressed by the first and second electrodes set in the first and second electrode caps.

Furthermore, first and second receiving recesses are formed in a center of a respective inner wall of the first and second electrode caps, for being fitted on the first and second electrodes of a second battery having a smaller diameter than the battery.

The first and second support arms have a springy characteristic, and bias the first and second electrode caps toward each other to squeeze the battery.

Furthermore, first and second hinge mechanisms keep the first and second support arms movable pivotally on the camera body, adapted for folding the first and second support arms at a time where the battery is not used.

The at least one release signal line comprises first and second release signal lines. The release switch is constituted by first and second line ends, included in the first and second release signal lines, and opposed to each other. Furthermore, a pushbutton is depressed by external operation, to cause the first and second line ends to contact one another.

Furthermore, a battery contact chamber contains the first terminal, wherein the first electrode accesses an inside of the battery contact chamber. A release switch chamber is disposed on an upside of the battery contact chamber, for containing the first and second line ends, wherein the pushbutton is slidable in the release switch chamber.

According to another aspect of the invention, a camera is supplied with power by a battery having first and second electrodes. There is a camera body. First and second support arms are disposed to protrude externally from the camera body. First and second electrode caps are secured to ends of respectively the first and second support arms, for being fitted on the first and second electrodes.

The first and second support arms are tubular. Furthermore, an electric circuit is incorporated in the camera body. First and second connection lines are connected with the electric circuit, and covered in the first and second support arms. First and second terminals are incorporated in the first and second electrode caps, for electrically connecting the first connection line with the first electrode, and the second connection line with the second electrode.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
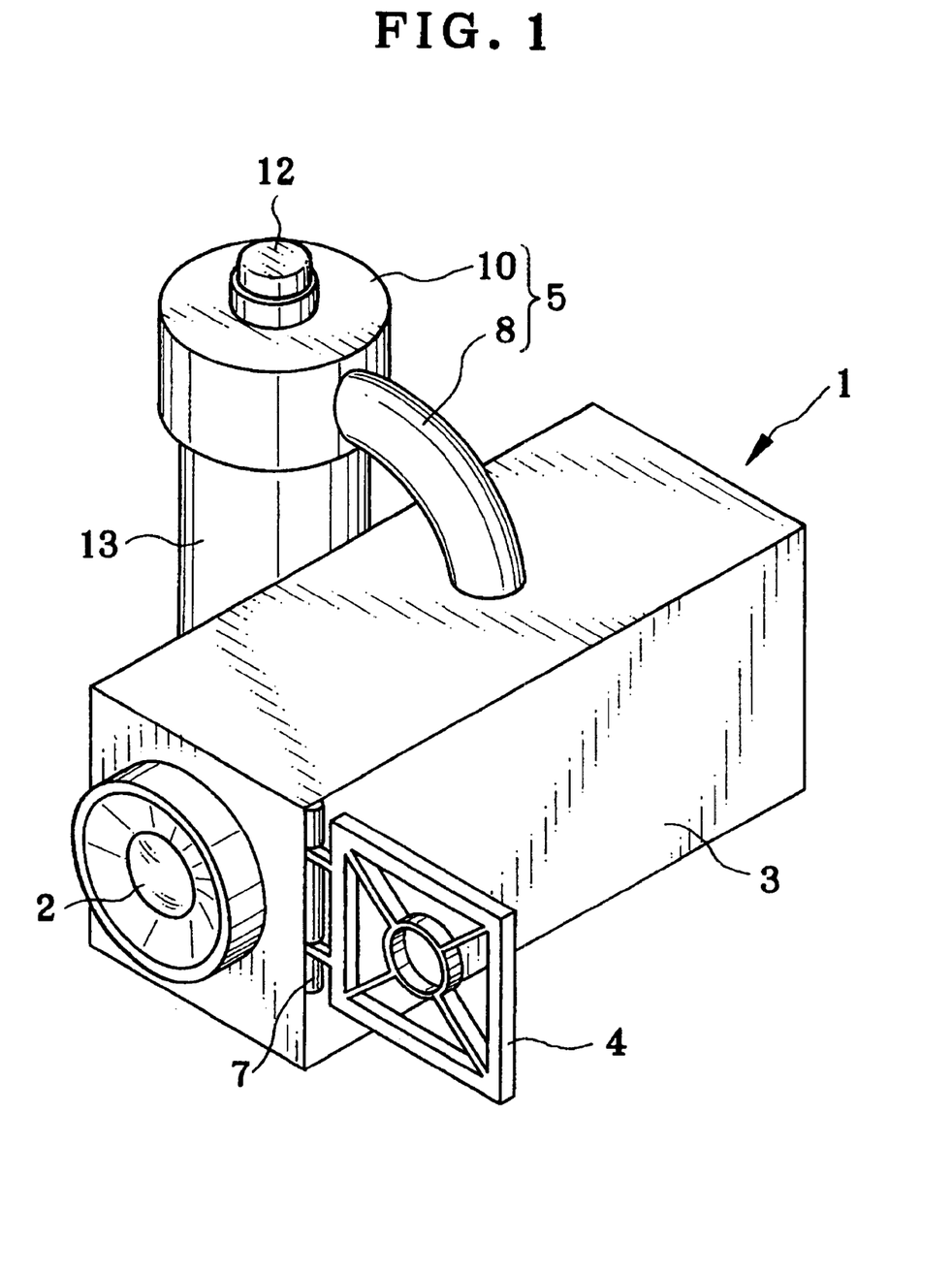
FIG. 1 is a perspective illustrating a digital still camera.
Figure 2:
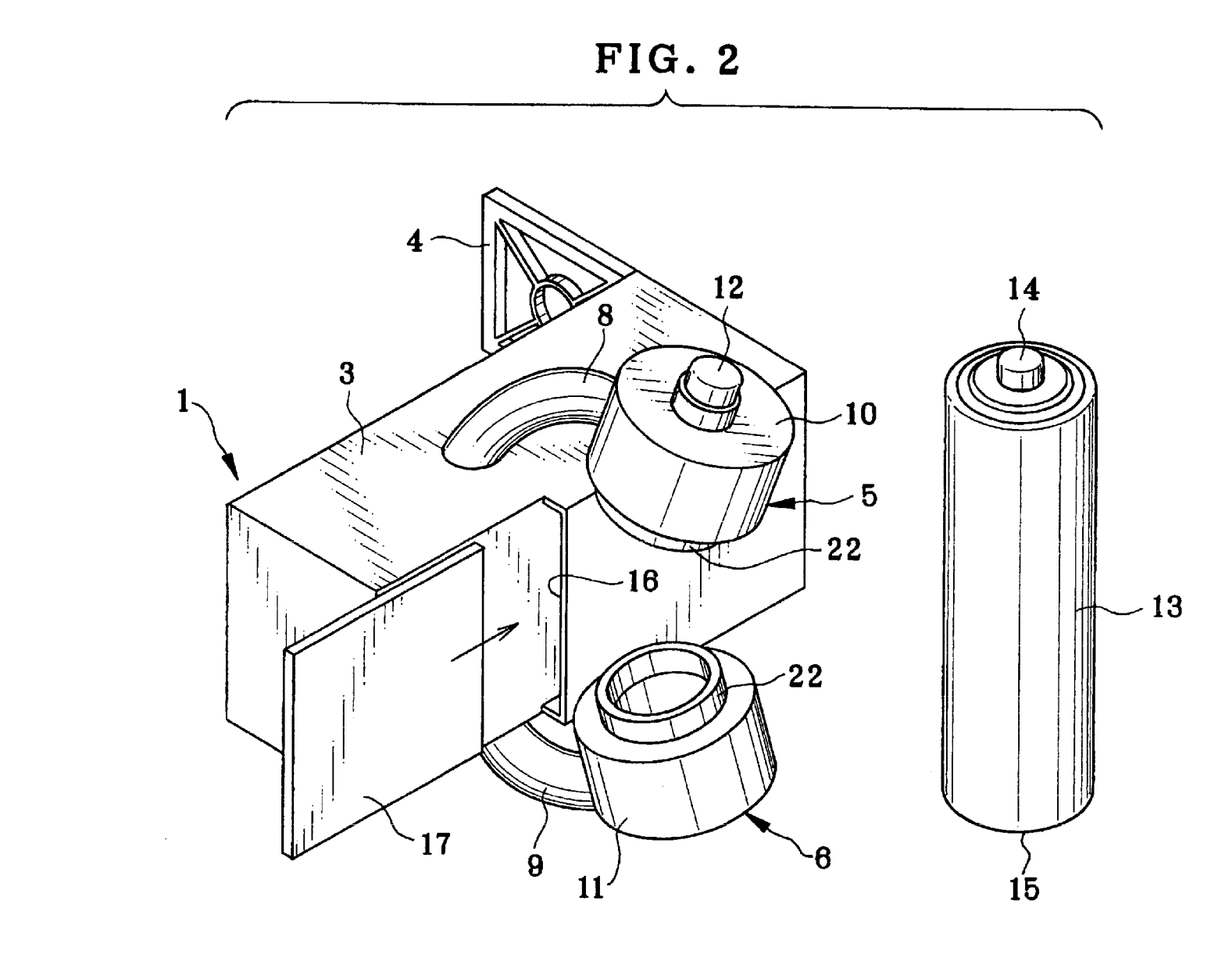
FIG. 2 is a perspective illustrating the digital still camera together with a battery before insertion.

In FIGS. 1 and 2, a digital still camera 1 includes a camera body 3, a frame-type viewfinder 4, and electrode caps 5 and 6. The camera body 3 has a shape of a rectangular quadrilateral prism. A taking lens 2 is disposed in a front surface of the camera body 3. The electrode caps 5 and 6 protrude from upper and lower surfaces of the camera body 3. A hinge mechanism 7 keeps the frame-type viewfinder 4 rotatable on the camera body 3. The electrode cap 5 has a cap body 10 provided with a tubular support arm 8 which constitutes a cord. Similarly, the electrode cap 6 has a cap body 11 provided with a tubular support arm 9 which constitutes a cord. A release pushbutton or release switch 12 is disposed in the cap body 10 in an externally operable manner.

A dry battery 13 has a positive electrode 14 and a negative electrode 15 positioned at end faces thereof. The positive electrode 14 of the battery 13 is fitted in the cap body 10, which covers the first end face. The negative electrode 15 of the battery 13 is fitted in the cap body 11, which covers the second end face. A memory card slot 16 is formed in a lateral wall of the camera body 3. A memory card 17 stores image data, and is inserted into the memory card slot 16.

The support arms 8 and 9 are formed from rubber material, and bias the cap bodies 10 and 11 toward each other. When the electrode caps 5 and 6 are spread by deforming the support arms 8 and 9, the electrode caps 5 and 6 become loadable with the battery 13. The battery 13 is fitted on the electrode caps 5 and 6, and becomes squeezed by recovering force of the support arms 8 and 9 on sides of both the positive and negative electrodes 14 and 15.

Figure 3:
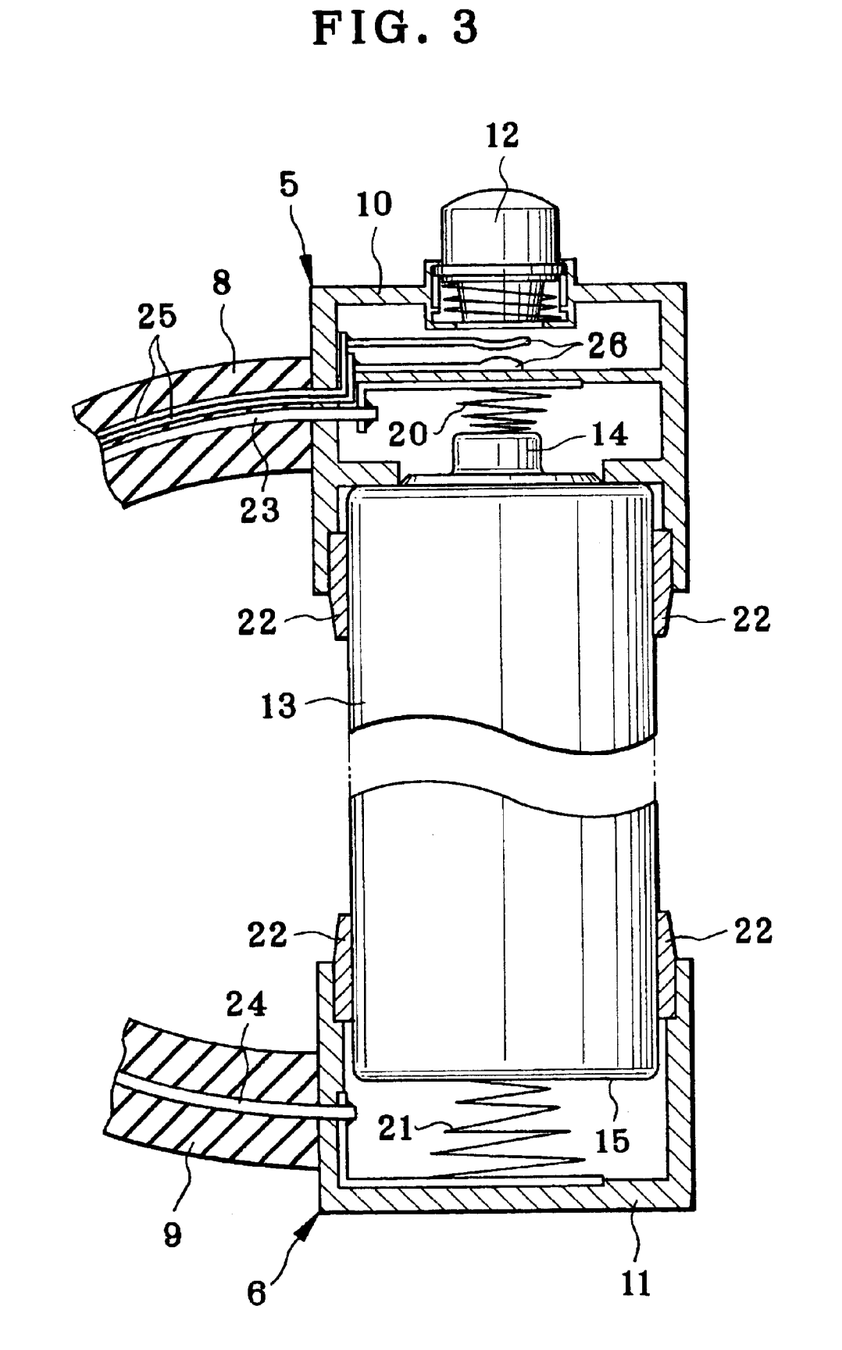
FIG. 3 is a vertical section illustrating the battery and two electrode caps.

In FIG. 3, a positive terminal spring 20 is incorporated in the cap body 10 for contact with the positive electrode 14. A negative terminal spring 21 is incorporated in the cap body 11 for contact with the negative electrode 15. The positive and negative terminal springs 20 and 21 are compression coil springs of a conical shape. A water-impermeable packing ring 22 of rubber is fitted inside each of the cap bodies 10 and 11, and is tightly fitted on a cylindrical surface of the battery 13. After the battery 13 is fitted on the cap bodies 10 and 11, the packing ring 22 blocks entry of water, dust or the like into a space about the electrode or terminal.

Connection lines 23 and 24 or cords are enclosed in the support arms 8 and 9. The positive terminal spring 20 is connected with the connection line 23. The negative terminal spring 21 is connected with the connection line 24. Release signal lines 25 are also accommodated in the support arm 8, and combined with the release pushbutton 12. When the release pushbutton 12 is depressed by manual operation, a pair of line end portions 26 of the release signal lines 25 are interconnected as a release switch, to send a release signal to circuits in the camera through the release signal lines 25.

Figure 4:
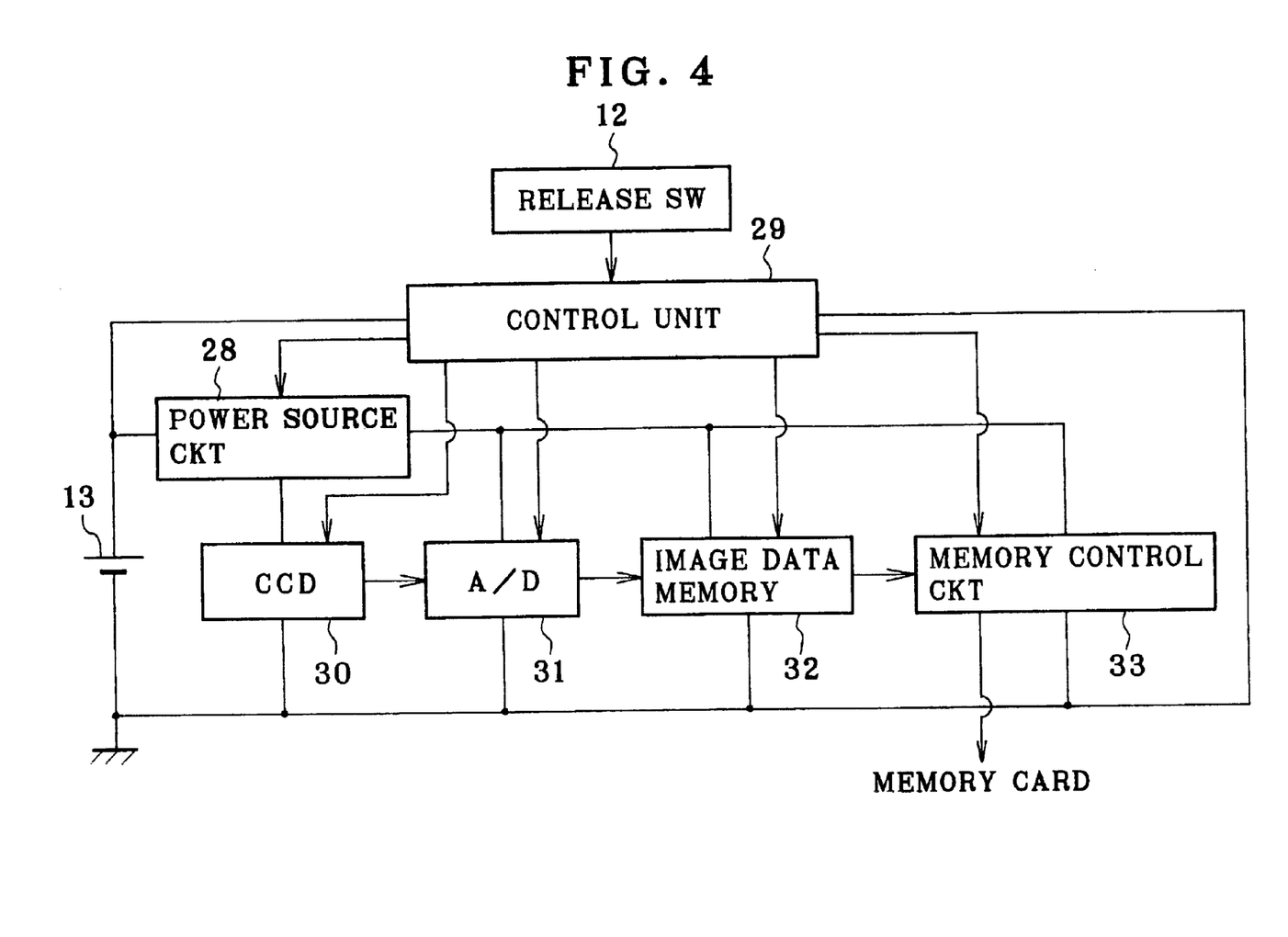
FIG. 4 is a block diagram schematically illustrating the camera.

In FIG. 4, a power source circuit 28 and a control unit 29 are incorporated in the digital still camera 1. When the release pushbutton 12 is depressed and operated, the control unit 29 drives the power source circuit 28 by a signal sent through the release signal lines 25. Also, the digital still camera 1 has a CCD 30, an A/D converter 31, an image data memory 32 and a memory control circuit 33. The power source circuit 28 is driven to supply those elements with electric power. If the release pushbutton 12 is kept depressed during operation of the power source circuit 28, the control unit 29 turns off the power source circuit 28 at a lapse of several seconds, to discontinue supply of the power to those elements.

The CCD 30 is disposed on a focal plane of the taking lens 2. When light from a photographic object is focused by the taking lens 2, the CCD 30 converts the object light photoelectrically, to output an image signal. The CCD 30 is a solid state pick-up element of a type of a low number of pixels, and includes hundreds of thousands of pixels, or under one megapixel. The image signal of an analog form from the CCD 30 is converted by the A/D converter 31 into a digital form, and is output as digital image data of one frame.

In a normal state, there is no writing of the digital image data. However, if a release signal is generated upon. depression of the release pushbutton 12, the A/D converter 31 outputs the digital image data and writes the same to the image data memory 32. The digital image data written to the image data memory 32 is sent to the memory control circuit 33, and written to the memory card 17. After a process of writing of the image data by the memory control circuit 33 is completed, then the digital image data is deleted from the image data memory 32.

The operation of the digital still camera 1 is described now. To load the battery 13, the electrode caps 5 and 6 are spread in directions away from one another against the bias of the support arms 8 and 9. The positive and negative electrodes 14 and 15 of the battery 13 are fitted in the cap bodies 10 and 11. The packing ring 22 becomes fitted tightly on the cylindrical surface of the battery 13, and blocks entry of foreign material or water to a space between the electrode and the terminal. The positive and negative electrodes 14 and 15 become contacted with the positive and negative terminal springs 20 and 21, and supply the circuits with power. The battery 13 is kept retained on the electrode caps 5 and 6 by the resiliency of the support arms 8 and 9.

After the memory card 17 is inserted, the release pushbutton 12 is depressed. The control unit 29 drives the power source circuit 28, to supply the CCD 30 with power. An object image focused on the CCD 30 by the taking lens 2 is converted to an image signal, which is converted into a digital form by the A/D converter 31. Again, the release pushbutton 12 is depressed. The digital image data of the object image being photographed is written to the image data memory 32. The image date stored in the image data memory 32 is sent to the memory control circuit 33, and written to the memory card 17. When the writing process of the image data is completed, data in the image data memory 32 is deleted. This being so, one image is photographed upon completion of the writing process of the image data later than the depression of the release pushbutton 12. When image recording is completed, the release pushbutton 12 is kept depressed, so that the control unit 29 turns off operation of the power source circuit 28. All of the circuit elements discontinue being supplied with power.

It is to be noted that a single release signal line may be used instead of the two release signal lines 25. A signal generator circuit may be incorporated in the cap body 10 of the electrode cap 5, may be turned on by depression of the release pushbutton 12, and can output a signal through the single release signal line 25.

Figure 5:
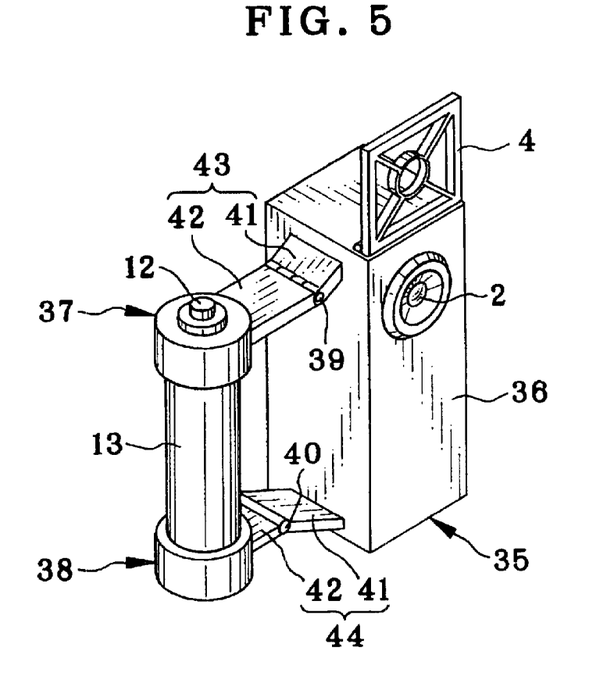
FIG. 5 is a perspective illustrating another preferred digital still camera with two electrode caps.
Figure 6:
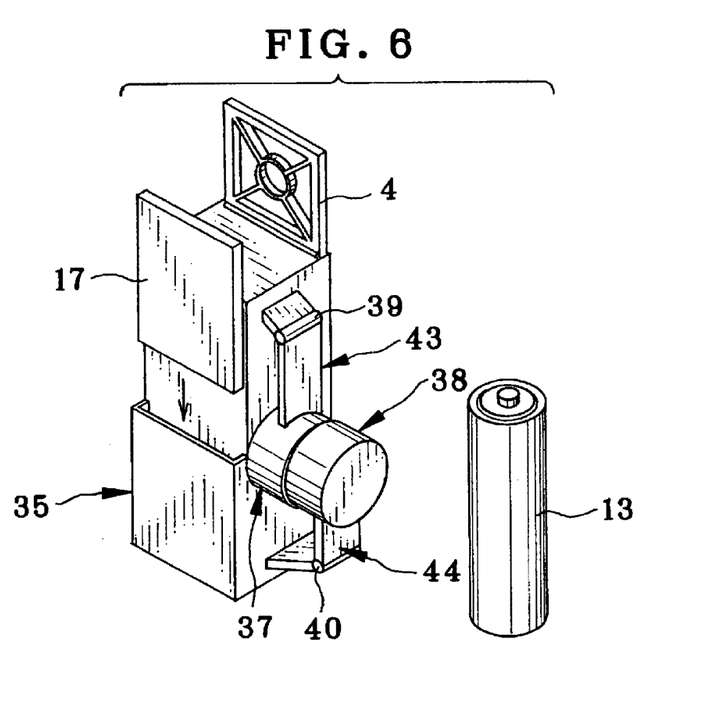
FIG. 6 is a perspective illustrating the same as FIG. 5 but together with a battery before insertion.

In FIGS. 5 and 6, another preferred embodiment is illustrated. Elements similar to those of the above embodiment are designated with identical reference numerals. A digital still camera 35 includes a camera body 36. Electrode caps 37 and 38 are disposed outside lateral surfaces of the camera body 36. The electrode cap 37 includes a cap body 45 and a tubular support arm 43 with a connection line. The support arm 43 includes a support portion 41 and a movable portion 42, which a hinge mechanism 39 connects with the support portion 41 in a pivotally movable manner. Similarly, the electrode cap 38 includes a cap body 46 and a tubular support arm 44 with a cord. The support arm 44 includes the support portion 41 and the movable portion 42, which a hinge mechanism 40 connects with the support portion 41 in a pivotally movable manner. While no battery 13 exists, the support arms 43 and 44 are bent by means of the hinge mechanisms 39 and 40. When a user wishes loading of the battery 13, the support arms 43 and 44 are spread and extended. While the battery 13 is squeezed and supported by the electrode caps 37 and 38, the battery 13 is ready to supply power. The support arms 43 and 44 can be bent to reduce the overall size of the camera while the camera is not loaded with the battery 13.

Figure 7:
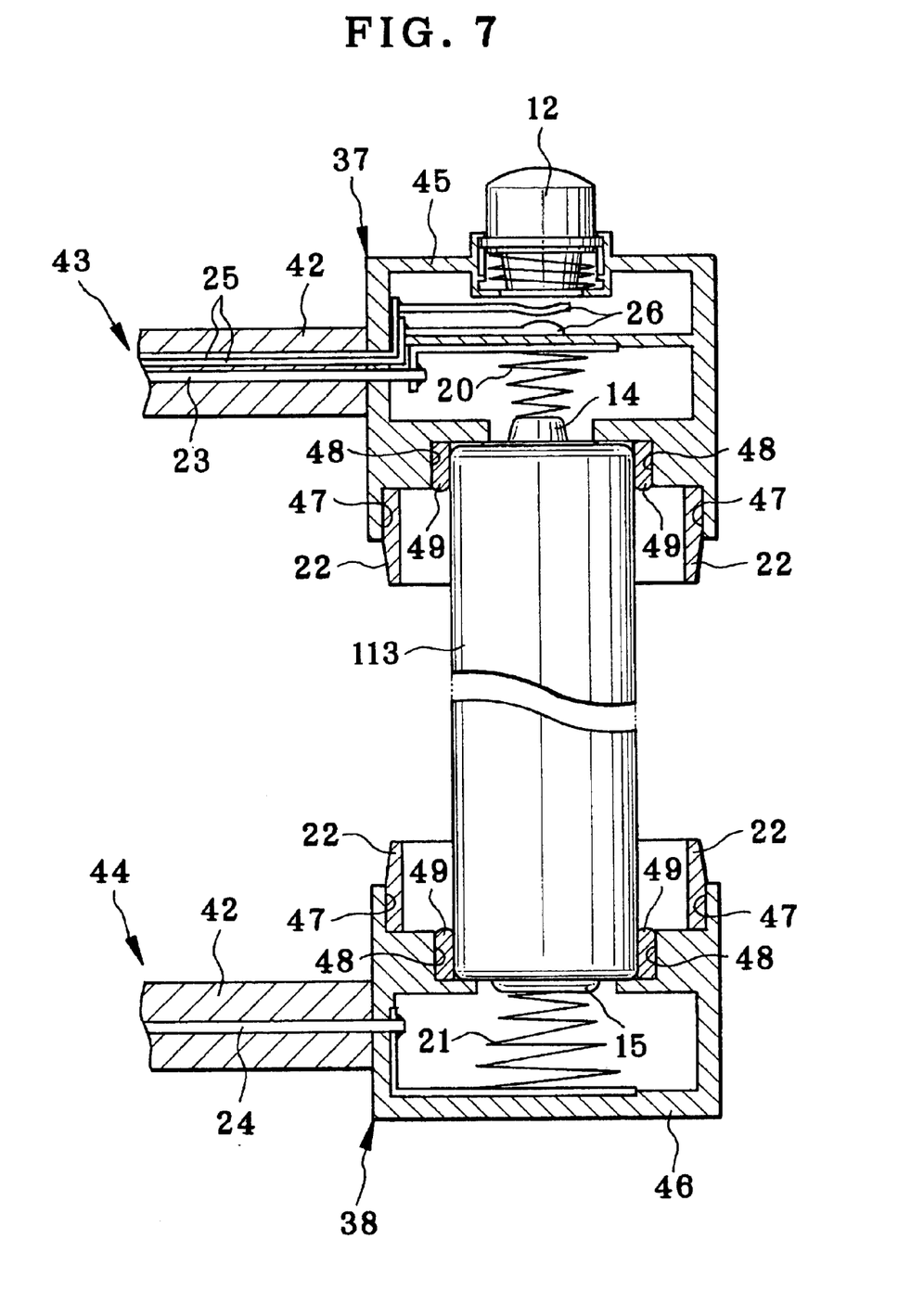
FIG. 7 is a vertical section illustrating a smaller battery of the AAA type and two electrode caps.

In FIG. 7, stepped portions are formed in the electrode caps 37 and 38. A great-diameter cap recess 47 is defined by the inside of each of the electrode caps 37 and 38, and receives the AA type of the battery 13. A small-diameter receiving recess 48 is formed in the center of each of the electrode caps 37 and 38, has a smaller diameter, and receives the AAA type of a dry battery 113. A water-impermeable packing ring 49 of rubber is inserted in the small-diameter receiving recess 48, contacts the cylindrical surface of the battery 113 of the AAA type, and blocks entry of water, dust or other foreign material. In a manner similar to the above embodiment, the connection lines 23 and 24 and the release signal lines 25 are accommodated in the support arms 43 and 44. The forming of the great-diameter cap recess 47 and the small-diameter receiving recess 48 makes it possible to use two or more batteries according to requirement.

Figure 8A:
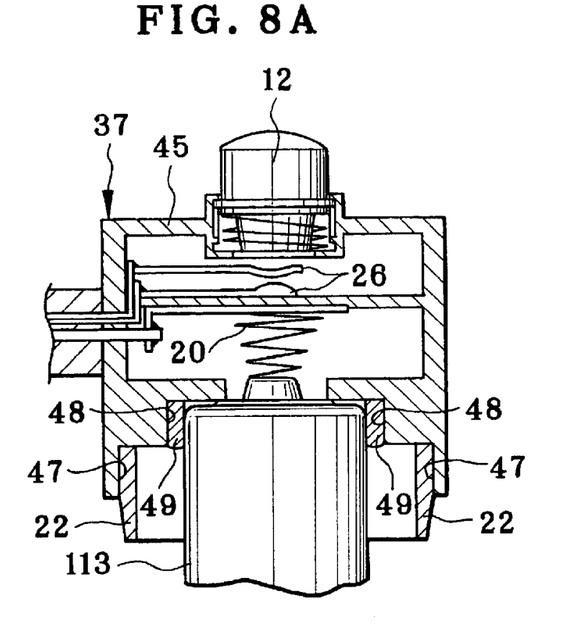
FIG. 8A is a vertical section, partially broken, illustrating a terminal at the first electrode together with the battery of the AAA type.
Figure 8B:
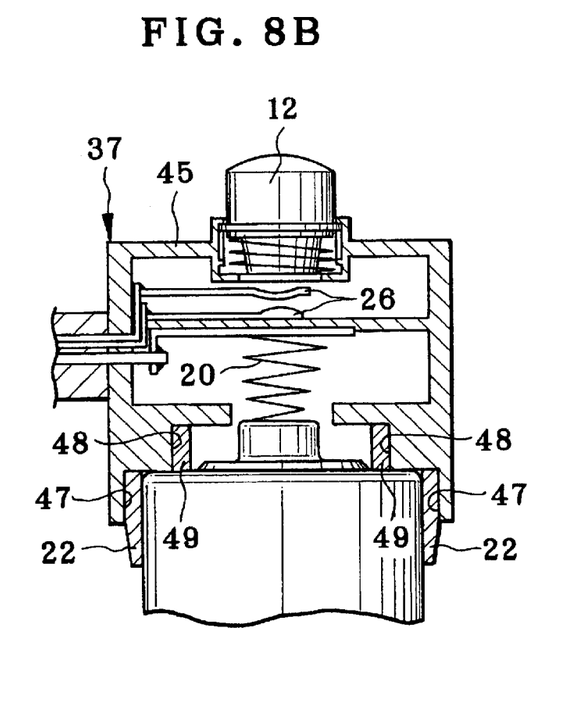
FIG. 8B is a vertical section, partially broken, illustrating the terminal at the first electrode together with the battery of the AA type.

In FIG. 8A, the AAA type of the battery 113 is set in the electrode cap 37. The packing ring 49 is tightly stuck on the cylindrical surface of the battery 113, which is fitted in the small-diameter receiving recess 48 fixedly. The positive terminal spring 20 is pushed by the positive electrode 14 of the battery, and compressed. The force of recovering the shape of the positive terminal spring 20 keeps itself in tight contact with the positive electrode 14, to ensure electrical connection. In FIG. 8B, the AA type of the battery 13 is set in the electrode cap 37. The packing ring 22 is tightly stuck on the cylindrical surface of the battery 13, which is fitted in the great-diameter cap recess 47 fixedly. The positive terminal spring 20 has a different shape in contact with the positive electrode 14 between the AA and AAA types. However, a compression coil spring constitutes the positive terminal spring 20, and can provide optimum pressure of contact by suitable compression according to the positions of the electrode. Also, the negative terminal spring 21 operates in the same manner as the positive terminal spring 20 in the electrode cap 38.

In the present embodiment, the great-diameter cap recess 47 and the small-diameter receiving recess 48 are formed in the electrode caps 37 and 38. Furthermore, a packing member of rubber can have a stepped portion, and fitted inside each of the electrode caps so as to receive two or more types of batteries selectively. Also, plural hinges may be disposed for bending the support arms 43 and 44 along two or more lines of bend. Furthermore, a spring may be combined with the hinge, and may bias the movable portion 42 in a direction to keep the electrode caps 37 and 38 folded in a normal state.

In the invention, it is possible that the support arms 8, 9, 43, 44 are omitted, and that the electrode caps 5, 6, 37, 38 for supporting the battery 13 are directly secured to the camera body 3, 36. Also, the electrode caps 5, 6, 37, 38 can have a construction to become folded on or contained in the camera body 3, 36. Also, the packing ring 22, 49 may be omitted. Instead, the electrode caps 5, 6, 37, 38 themselves may be formed from elastic material for keeping a shielding structure with water tightness. A plurality of the batteries 13 may be arranged and fitted in the single set of the electrode caps 5, 6, 37, 38. In such a set of multiple type of electrode caps, a first set of cap recesses may have the positive and negative terminal springs 20 and 21 as above, and a second set of cap recesses may constitute a spare holder for insertion of a spare battery without having the positive and negative terminal springs 20 and 21. Furthermore, the camera according to the invention may be a photographic camera for use with silver halide photosensitive material, and other types instead of the digital still camera 1, 35.

For use with the plural batteries 13, N cap recesses 47 may be formed in each of the first and second electrode caps 5, 6, 37, 38 in an extended shape to support N batteries 13. The first cap recess 47 in the first electrode cap 5, 37 may be opposed to the second cap recess 47 in the second electrode cap 6, 38. The third cap recess in the first electrode cap 5, 37 may be opposed to the fourth cap recess in the second electrode cap 6, 38. The (2N−1)th cap recess in the first electrode cap 5, 37 may be opposed to the (2N)th cap recess in the second electrode cap 6, 38.

Alternatively, 2N electrode caps 5, 6, 37, 38 may be used for being loaded with the N batteries 13. The first electrode cap 5, 37 may be opposed to the second electrode cap 6, 38. The third electrode cap may be opposed to the fourth electrode cap. The (2N−1)th electrode cap may be opposed to the (2N)th electrode cap.

Note that one of the electrode caps 5, 6, 37, 38 may be directly secured on the camera body 3, 36. Only a second one of the electrode caps 5, 6, 37, 38 can be connected with a single support arm, which can bias the second electrode cap, to retain the battery 13 with resiliency.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera, having a camera body including an electric circuit for being supplied with power by a battery having first and second electrodes, said camera comprising:
   first and second electrode caps, secured to an outside of said camera body, for being fitted on said first and second electrodes; and
   first and second terminals, disposed in said first and second electrode caps, for connecting said electric circuit electrically with said first and second electrodes.

2. A camera as defined in claim 1, wherein said battery is in a substantially cylindrical shape, and has said first and second electrodes disposed at opposite ends thereof.

3. A camera as defined in claim 2, further comprising first and second support arms, disposed to protrude externally from said camera body, for supporting said first and second electrode caps at ends thereof.

4. A camera as defined in claim 3, further comprising first and second connection lines, connected with said electric circuit, inserted through said first and second support arms, for being connected with said first and second electrodes by said first and second terminals.

5. A camera as defined in claim 4, further comprising a release switch, secured to said first electrode cap, for being operated to photograph an image.

6. A camera as defined in claim 5, further comprising at least one release signal line, contained in said first support arm, for extending between said release switch and said electric circuit, to send a signal generated upon turning on of said release switch.

7. A camera as defined in claim 5, wherein pressing said release switch when said camera is in an off state causes said camera to enter an on state such that power is supplied by said battery to one or more components of said camera.

8. A camera as defined in claim 7, wherein pressing said release switch for a predetermined period of time when said camera is in said on state causes said camera to enter said off state such that said power is no longer supplied by said battery to said one or more components of said camera.

9. A camera as defined in claim 4, wherein said first and second terminals have a springy characteristic, and tightly contact said first and second electrodes.

10. A camera as defined in claim 4, further comprising first and second hinge mechanisms for keeping said first and second support arms movable pivotally on said camera body, to render said first and second support arms foldable at a time where said battery is not used.

11. A camera as defined in claim 2, further comprising a support arm, disposed to protrude externally from said camera body, for supporting one of said first and second electrode caps at an end thereof.

12. A camera as defined in claim 1, wherein a plurality of cap recesses are formed in each of said first and second electrode caps to accommodate a corresponding plurality of batteries.

13. A camera as defined in claim 1, wherein a plurality of electrode cap pairs are provided such that each electrode cap pair is operable to accommodate a single battery.

14. A camera as defined in claim 1, wherein said single battery is one of a AA battery and a AAA battery.

15. A camera, having a camera body including an electric circuit for being supplied with power by a battery having first and second electrodes, said camera comprising:
   first and second electrode caps, secured to an outside of said camera body, for being fitted on said first and second electrodes;
   first and second terminals, disposed in said first and second electrode caps, for connecting said electric circuit electrically with said first and second electrodes;
   first and second support arms, disposed to protrude externally from said camera body, for supporting said first and second electrode caps at ends thereof; and
   first and second packing skirts, secured to an inner surface of said first and second electrode caps, for tightly contacting peripheral portions about said first and second electrodes,
   wherein said battery is in a substantially cylindrical shape, and has said first and second electrodes disposed at ends thereof.

16. A camera, having a camera body including an electric circuit for being supplied with power by a battery having first and second electrodes, said camera comprising:
   first and second electrode caps, secured to an outside of said camera body, for being fitted on said first and second electrodes;
   first and second terminals, disposed in said first and second electrode caps, for connecting said electric circuit electrically with said first and second electrodes;
   first and second support arms, disposed to protrude externally from said camera body, for supporting said first and second electrode caps at ends thereof;
   first and second connection lines, connected with said electric circuit, inserted through said first and second support arms, for being connected with said first and second electrodes by said first and second terminals; and
   first and second receiving recesses, formed in a center of a respective inner wall of said first and second electrode caps, for being fitted on said first and second electrodes of a second battery having a smaller diameter than said battery,
   wherein said battery is in a substantially cylindrical shape, and has said first and second electrodes disposed at ends thereof.

17. A camera, having a camera body including an electric circuit for being supplied with power by a battery having first and second electrodes, said camera comprising:
   first and second electrode caps, secured to an outside of said camera body, for being fitted on said first and second electrodes;
   first and second terminals, disposed in said first and second electrode caps, for connecting said electric circuit electrically with said first and second electrodes;
   first and second support arms, disposed to protrude externally from said camera body, for supporting said first and second electrode caps at ends thereof; and
   first and second connection lines, connected with said electric circuit, inserted through said first and second support arms, for being connected with said first and second electrodes by said first and second terminals,
   wherein said battery is in a substantially cylindrical shape, and has said first and second electrodes disposed at ends thereof, and
   wherein said first and second support arms have a springy characteristic, and bias said first and second electrode caps toward each other to squeeze said battery.

18. A camera as defined in claim 17, wherein said first and second support arms are formed from rubber material.

19. A camera, having a camera body including an electric circuit for being supplied with power by a battery having first and second electrodes, said camera comprising:
   first and second electrode caps, secured to an outside of said camera body, for being fitted on said first and second electrodes;

first and second terminals, disposed in said first and second electrode caps, for connecting said electric circuit electrically with said first and second electrodes;

first and second support arms, disposed to protrude externally from said camera body, for supporting said first and second electrode caps at ends thereof;

first and second connection lines, connected with said electric circuit, inserted through said first and second support arms, for being connected with said first and second electrodes by said first and second terminals;

a release switch, secured to said first electrode cap, for being operated to photograph an image;

at least one release signal line, contained in said first support arm, for extending between said release switch and said electric circuit, to send a signal generated upon turning on of said release switch;

a battery contact chamber for containing said first terminal, wherein said first electrode accesses an inside of said battery contact chamber;

a release switch chamber, disposed on an upside of said battery contact chamber, for containing said release switch; and a pushbutton for turning on said release switch, wherein said battery is in a substantially cylindrical shape, and has said first and second electrodes disposed at ends thereof.

20. A camera, having a camera body including an electric circuit for being supplied with power by a rod-shaped battery having first and second electrodes at opposite ends thereof, said camera comprising:

first and second support arms disposed to protrude externally from said camera body;

first and second electrode caps, secured to ends of respectively said first and second support arms, for being fitted on said first and second electrodes.

21. A camera, having a camera body including an electric circuit for being supplied with power by a rod-shaped battery having first and second electrodes at ends thereof, said camera comprising:

first and second support arms disposed to protrude externally from said camera body; first and second electrode caps, secured to ends of respectively said first and second support arms, for being fitted on said first and second electrodes;

first and second connection lines, connected with said electric circuit, and disposed inside said first and second support arms; and first and second terminals, disposed in said first and second electrode caps, for electrically connecting said first connection line with said first electrode, and said second connection line with said second electrode.

22. A camera as defined in claim 21, wherein said first and second support arms have a resilient characteristic, and bias said first and second electrode caps toward each other to squeeze said battery.

23. A camera as defined in claim 22, wherein said first and second support arms are formed from rubber material.

24. A camera as defined in claim 21, further comprising first and second hinge mechanisms for keeping said first and second support arms movable pivotally on said camera body, to render said first and second support arms foldable at a time where said battery is not used.

* * * * *